United States Patent
Bitran

(10) Patent No.: US 8,160,001 B2
(45) Date of Patent: *Apr. 17, 2012

(54) MULTI-FUNCTION WIRELESS TERMINAL

(75) Inventor: Yigal Bitran, Ramat Hasharon (IL)

(73) Assignee: Altair Semiconductor Ltd., Hod Hasharon (IL)

( * ) Notice: Subject to any disclaimer, the term of this patent is extended or adjusted under 35 U.S.C. 154(b) by 2 days.

This patent is subject to a terminal disclaimer.

(21) Appl. No.: 11/647,122

(22) Filed: Dec. 27, 2006

(65) Prior Publication Data

US 2007/0275746 A1    Nov. 29, 2007

Related U.S. Application Data

(60) Provisional application No. 60/803,192, filed on May 25, 2006.

(51) Int. Cl.
*H04Q 7/00* (2006.01)

(52) U.S. Cl. ........ 370/328; 455/502; 455/418; 455/509; 455/552.1; 455/507; 370/503; 370/346; 370/327

(58) Field of Classification Search .................. 370/329, 370/331, 350, 321, 337, 444, 346–347, 328; 455/41.2

See application file for complete search history.

(56) References Cited

U.S. PATENT DOCUMENTS

| | | | |
|---|---|---|---|
| 6,130,886 A * | 10/2000 | Ketseoglou et al. | 370/347 |
| 6,985,432 B1 | 1/2006 | Hadad | |
| 7,133,646 B1 | 11/2006 | Miao | |
| 7,133,669 B2 | 11/2006 | Nair et al. | |
| 7,289,804 B2 | 10/2007 | Kim | |
| 7,363,051 B2 | 4/2008 | Bridgelall | |
| 7,406,296 B2 * | 7/2008 | Haartsen | 455/41.2 |
| 7,430,421 B2 | 9/2008 | Park | |
| 7,904,112 B2 | 3/2011 | Bitran et al. | |
| 2002/0136233 A1 | 9/2002 | Chen et al. | |
| 2002/0181509 A1 | 12/2002 | Mody et al. | |
| 2003/0054788 A1 | 3/2003 | Sugar et al. | |
| 2003/0169824 A1 | 9/2003 | Chayat | |
| 2004/0029619 A1 | 2/2004 | Liang et al. | |
| 2004/0162106 A1 * | 8/2004 | Monroe et al. | 455/552.1 |
| 2005/0020299 A1 | 1/2005 | Malone et al. | |

(Continued)

OTHER PUBLICATIONS

Specification of the Bluetooth System, Master Table of Contents & Compliance Requirements, Nov. 2004.

(Continued)

*Primary Examiner* — Charles Appiah
*Assistant Examiner* — Randy Peaches
(74) *Attorney, Agent, or Firm* — D. Kligler IP Services Ltd.

(57) ABSTRACT

A communication method includes establishing a first communication session over a first connection between a wireless terminal and a base station (BS) of a long-range wireless data network, which operates in accordance with a first protocol that defines a sequence of time frames. Based on the time frames defined by the BS, time slots are allocated for establishing a second communication session over a second connection between the wireless terminal and a peripheral wireless device, which operates in accordance with a second, short-range time-slotted communication protocol different from the first protocol.

Time intervals are allocated within the time frames for communication between the BS and the wireless terminal over the first connection, such that the allocated time intervals are interleaved with and do not overlap the allocated time slots. The first and second communication sessions are concurrently conducted in the allocated time intervals and the assigned time slots, respectively.

40 Claims, 4 Drawing Sheets

U.S. PATENT DOCUMENTS

| | | | |
|---|---|---|---|
| 2005/0025093 | A1 | 2/2005 | Yun et al. |
| 2005/0059347 | A1 | 3/2005 | Haartsen |
| 2005/0101261 | A1 | 5/2005 | Weinzweig et al. |
| 2005/0128990 | A1 | 6/2005 | Eom et al. |
| 2005/0195786 | A1 | 9/2005 | Shpak |
| 2006/0198476 | A1 | 9/2006 | Palaskas et al. |
| 2006/0221917 | A1 | 10/2006 | McRae |
| 2007/0066359 | A1 | 3/2007 | Zhuang |
| 2007/0076649 | A1* | 4/2007 | Lin et al. ............. 370/328 |
| 2007/0104145 | A1 | 5/2007 | Jan |
| 2007/0124478 | A1 | 5/2007 | Abdelhamid et al. |
| 2007/0140256 | A1 | 6/2007 | Yaqub |
| 2007/0165594 | A1* | 7/2007 | Heinle et al. ............. 370/350 |
| 2007/0183383 | A1 | 8/2007 | Bitran et al. |
| 2007/0184798 | A1 | 8/2007 | Bitran et al. |
| 2007/0184835 | A1 | 8/2007 | Bitran et al. |
| 2007/0280096 | A1 | 12/2007 | Yanover et al. |
| 2008/0132180 | A1 | 6/2008 | Manicone |
| 2008/0167031 | A1 | 7/2008 | Sorber et al. |
| 2008/0205365 | A1 | 8/2008 | Russell et al. |
| 2008/0233875 | A1 | 9/2008 | Desai et al. |
| 2009/0054009 | A1* | 2/2009 | Yang et al. ............. 455/78 |
| 2009/0081962 | A1 | 3/2009 | Sohrabi |
| 2009/0111500 | A1 | 4/2009 | Sudak et al. |
| 2009/0129367 | A1 | 5/2009 | Bitran |
| 2009/0285167 | A1 | 11/2009 | Hirsch et al. |

OTHER PUBLICATIONS

David Gesbert, et al., "From Theory to Practice: An Overview of MIMO Space-Time Coded Wireless Systems", IEEE Journal on Selected Areas in Communications, vol. 21, No. 3, Apr. 2003.
U.S. Appl. No. 60/772,101.
U.S. Appl. No. 60/820,523.
U.S. Appl. No. 60/803,192.
http://www.ieee802.org/16.
http://www.wimaxforum.org.
http://www.nxp.com/products/connectivity.
TriMAX™, Altair White Paper, Rev. 1.00, Jul. 2006.
Bitran et al., U.S. Appl. No. 12/426,251 "Dual-function wireless data terminal" filed on Apr. 19, 2009.
Bitran et al., U.S. Appl. No. 12/426,252 "Simultaneous operation of WLAN and long-range wireless connections" filed on Apr. 19, 2009.
Philips Semiconductors, "How 802.11b/g WLAN and Bluetooth Can Play", White Paper, Koninklijke Philips Electronics N.V., Netherlands, 2005.
Texas Instruments Incorporated, "Wireless Performance Optimization Solutions: Bluetooth and 802.11 coexistence", USA, 2003.
U.S. Appl. No. 12/426,252 Official Action dated Sep. 9, 2009.
International Application PCT/IL207/001227 Search Report dated Aug. 19, 2009.
U.S. Appl. No. 11/943,094 Official Action dated Feb. 18, 2011.
U.S. Appl. No. 12/702,332 Official Action dated Aug. 17, 2010.
U.S. Appl. No. 11/943,094 Official Action dated Apr. 29, 2011.
U.S. Appl. No. 60/772,167, filed Feb 9, 2006.
U.S. Appl. No. 60/820,523, filed Jul. 27, 2006.
U.S. Appl. No. 60/803,192, filed May 25, 2006.
IEEE 802.16 Working Group on BroadBand Wireless Access Standards develops the IEEE 802.16 WirelessMan Standard for Wireless Metropolitan Area Networks, downloaded from http://www.ieee802.org/16 on May 12, 2007.
WIMAX News downloaded from http://www.wimaxforum.org/home on May 12, 2007.
NXP Semiconductors, "NXP Connectivity", year 2006 (http://www.nxp.com/products/connectivity).

* cited by examiner

MULTI-FUNCTION WIRELESS TERMINAL

CROSS-REFERENCE TO RELATED APPLICATION

This application claims the benefit of U.S. Provisional Patent Application 60/803,192, filed May 25, 2006, which is incorporated herein by reference.

FIELD OF THE INVENTION

The present invention relates generally to wireless communications, and specifically to wireless terminals capable of operating using multiple different communication protocols.

BACKGROUND OF THE INVENTION

Wireless local area networks (WLANs) have gained broad popularity. The original IEEE 802.11 WLAN standard was designed to enable communications at 1-2 Mbps in a band around 2.4 GHz. More recently, IEEE working groups have defined the 802.11a, 802.11b, 802.11e, 802.11g, 802.11n and other extensions to the original standard, in order to enable higher data rates. In the context of the present patent application and in the claims, the term "802.11" is used to refer collectively to the original IEEE 802.11 standard and all its variants and extensions, unless specifically noted otherwise. WLAN is also sometimes referred to as Wi-Fi®.

WiMAX (Worldwide Interoperability for Microwave Access) is a new technology for wireless packet data communications, which is similar in concept to IEEE 802.11, but has, a number of enhancements designed to improve performance and range. The original WiMAX standard, IEEE 802.16, specified WiMAX in the 10-66 GHz range. More recently, IEEE 802.16a added support for the 2-11 GHz range, and IEEE 802.16e (approved as IEEE 802.16-2005) extended WiMAX to mobile applications, using an enhanced orthogonal frequency division multiple access (OFDMA) modulation scheme. In the context of the present patent application and in the claims, the term "802.161" is used to refer collectively to the original IEEE 802.16 standard and all its variants and extensions, unless specifically noted otherwise.

Bluetooth® wireless technology is a short-range communication technology intended to replace the cables connecting portable and/or fixed devices while maintaining high levels of security. The latest Bluetooth specification, entitled "Specification of the Bluetooth System, Core Version 2.0+Enhanced Data Rate (EDR)," November, 2004, defines a uniform structure for a wide range of devices to connect and communicate with each other. This specification, as well as additional information regarding Bluetooth, is available at www.bluetooth.com. In the context of the present patent application and in the claims, the term "Bluetooth Core Specification" is used to refer collectively to the Version 2.0 specification, to its variants and extensions and to earlier versions of the specification, unless specifically noted otherwise.

WLAN, WiMAX and Bluetooth systems often operate in adjacent or overlapping frequency bands, and thus may potentially interfere with one another. This interference is particularly severe when WLAN, WiMAX and/or Bluetooth devices are collocated in a single wireless terminal.

Several methods and devices are known in the art for enabling the coexistence of WLAN and Bluetooth communication in the same wireless terminal. For example, Texas Instruments, Inc. (Dallas, Tex.) offers a hardware and software solution that allows users to run Bluetooth and 802.11a/b/g mobile WLAN simultaneously. The software monitors WLAN and Bluetooth traffic patterns and, when both 802.11 and Bluetooth require bandwidth, the software uses multiplexing techniques to allocate the bandwidth for simultaneous functions. Additional information regarding this solution is available at focus.ti.com/general/docs/wtbu/wtbuproductcontent.tsp?templateId=6123&navigationId=12022&contentId=4655.

As another example, NXP Semiconductors (Eindhoven, Netherlands) provides another hardware and software solution, which enables Bluetooth and WLAN coexistence using packet transmission arbitration techniques. Details regarding this solution are available at www.nxp.com/products/connectivity.

SUMMARY OF THE INVENTION

There is therefore provided, in accordance with an embodiment of the present invention, a method for communication, including;
  establishing a first communication session over a first connection between a wireless terminal and a base station (BS) of a long-range wireless data network, which operates in accordance with a first protocol that defines a sequence of time frames;
  allocating time slots, based on the time frames defined by the BS, for establishing a second communication session over a second connection between the wireless terminal and a peripheral wireless device, which operates in accordance with a second, short-range time-slotted communication protocol different from the first protocol;
  allocating time intervals within the time frames for downlink and uplink transmission between the BS and the wireless terminal over the first connection such that the allocated time intervals are interleaved with and do not overlap the allocated time slots; and
  concurrently conducting the first and second communication sessions in the allocated time intervals and the assigned time slots, respectively.

In some embodiments, the long-range wireless data network includes a WiMAX network that operates in accordance with an IEEE 802.16 standard, and the second connection operates in accordance with a Bluetooth Core Specification. The second protocol may operate in accordance with at least one of a Synchronous Connection-Oriented (SCO) mode and an Asynchronous Connectionless Link (ACL) mode of the Bluetooth core specification.

In another embodiment, the method further includes establishing a third communication session over a third connection with an access point (AP) of a wireless local area network (WLAN) in accordance with a third protocol different from the first and second protocols, during time periods that do not overlap the time slots of the first connection and the time intervals of the second connection, and conducting the third communication session concurrently with the first and second sessions.

In yet another embodiment, the third protocol includes a protocol in which the time periods used by the third communication session are initiated by the wireless terminal, and establishing the third communication session includes selecting the time periods by the wireless terminal so as not to overlap the time slots of the first connection and the time intervals of the second connection. The WLAN may operate in accordance with an IEEE 802.11 standard. In some embodiments, the third connection operates in accordance with an Unscheduled Power Save Delivery (UPSD) mode of the IEEE 802.11 standard. In a disclosed embodiment, additional optional time slots are allocated to one of the first, second and third connections when not previously allocated to another of the first, second and third connections.

In another embodiment, establishing the first communication session includes handing over the wireless terminal from the WLAN to the long-range wireless data network while the third communication session is in progress. Additionally or alternatively, establishing the third communication session includes handing over the wireless terminal from the long-range wireless data network to the WLAN while the third communication session is in progress.

In yet another embodiment, allocating the time slots based on the time frames includes synchronizing the allocated time slots with the time frames defined by the BS. In an embodiment, the second communication session includes a voice connection between the wireless terminal and the peripheral device, and allocating the time slots for the second communication session includes allocating the time slots at regular intervals. Additionally or alternatively, allocating the time intervals within the time frames includes notifying the BS that the wireless terminal is not available to communicate with the BS outside the allocated time intervals.

In some embodiments, establishing the second communication session includes initially establishing the second connection such that a timing of the time slots is determined by the peripheral device, and subsequently causing the timing of the time slots to be determined by the wireless terminal, so as to enable the time slots to be synchronous with the time frames of the first protocol defined by the BS. Causing the timing of the time slots to be determined by the wireless terminal may include invoking a Master-Slave Switching (MSS) procedure defined in the second protocol. Alternatively, causing the timing of the time slots to be determined by the wireless terminal includes aborting establishment of the second connection by the wireless terminal after receiving an address of the peripheral device, and initiating a paging procedure by the wireless terminal using the received address, so as to re-establish the second connection with the timing of the time slots determined by the wireless terminal.

In another embodiment, establishing the second communication session includes carrying out an inquiry procedure by the wireless terminal in order to identify the peripheral device, and coordinating the allocated time slots and time intervals during the inquiry procedure. In yet another embodiment, establishing the second communication session includes transmitting synchronization transmissions from the wireless terminal to the peripheral device in a low-power mode of the second protocol, and giving a priority to the synchronization transmissions over the time intervals of the first connection.

In still another embodiment, establishing the second communication session includes transmitting paging transmissions between the wireless terminal and the peripheral device for establishing the second connection, while coordinating the exchange of the paging transmissions with the time intervals of the first connection. Establishing the second communication session may include defining a subset of the time frames of the first connection as reduced-availability frames, notifying the BS that the wireless terminal is not available to communicate with the BS during the reduced-availability frames, and giving a priority to establishing the second communication session during the reduced-availability frames.

There is additionally provided, in accordance with an embodiment of the present invention, a wireless communication terminal, including:

a radio frequency (RF) unit; and a baseband processing circuit, which is coupled to cause the RF unit to transmit and receive signals over the air so as to establish a first communication session over a first connection with a base station (BS) of a long-range wireless data network, which operates in accordance with a first protocol that defines a sequence of time frames, and to establish a second communication session over a second connection between the wireless terminal and a peripheral wireless device, which operates in accordance with a second, short-range time-slotted communication protocol different from the first protocol; and a coexistence processor, which is arranged to allocate time slots based on the time frames defined by the BS, for the second session and to allocate time intervals within the time frames for downlink and uplink transmission between the BS and the wireless terminal over the first connection such that the allocated time intervals are interleaved with and do not overlap the allocated time slots, so as to concurrently conduct the first and second communication sessions in the allocated time intervals and the assigned time slots, respectively.

In some embodiments, the baseband processing circuit includes first, second and third transceivers, which are respectively arranged to communicate with the BS, the peripheral device and the AP, and the coexistence processor is connected to the transceivers using respective coexistence interfaces and is arranged to allocate the time intervals, time slots and time periods by signaling to the transceivers over the coexistence interfaces.

In another embodiment, the baseband processing circuit includes a first sub-circuit including the second and third transceivers, and a second sub-circuit including the first transceiver and the coexistence processor, and the coexistence processor is arranged to control the second and third transceivers using the coexistence interfaces, which are connected between the first and second sub-circuits.

The present invention will be more fully understood from the following detailed description of the embodiments thereof, taken together with the drawings in which:

DETAILED DESCRIPTION OF EMBODIMENTS

Overview

Embodiments of the present invention that are described hereinbelow provide multi-function communication terminals, which can communicate simultaneously with WLAN access points (APs), WiMAX base stations (BSs) and Bluetooth-enabled devices without mutual interference, despite operating in the same or overlapping frequency bands. The wireless terminal typically comprises WLAN, WiMAX and Bluetooth transceivers, as well as a coexistence processor that coordinates the transmission and reception over the different links.

The WLAN, WiMAX and Bluetooth links are coordinated by allocating time slots for the three links in accordance with a predetermined, repetitive super-frame. Since in WiMAX the timing of the link is determined by the BS, the coexistence processor synchronizes the timing of the super-frame, and thus also the timing of the WLAN and Bluetooth links, to the timing of the WiMAX BS with which the terminal communicates.

The slot allocation scheme in the super-frame gives precedence to the Bluetooth link, since the voice overlay profile defined in the Bluetooth protocol has little flexibility in defining slot patterns. The precedence given to Bluetooth transmissions also reduces the latency and jitter of voice traffic that is carried over the Bluetooth link.

WiMAX uplink and downlink slots are allocated so as to coincide with the uplink and downlink zones of the WiMAX frames, respectively, as determined by the base station. As a result, the terminal is able to receive MAP messages and downlink data from the BS, and to transmit uplink data at the appropriate time zones defined by the BS. WLAN operation of the terminal uses operational modes of the IEEE 802.11 standard in which communication over the WLAN link is initiated by the terminal.

In addition to allocating dedicated time slots to each link, the super-frame comprises optional, "bandwidth opportunity" slots. An optional slot can be used by a particular transceiver as long as it is not already in use by another transceiver. Mutual coordination regarding the use of optional slots is typically carried out using "busy" interfaces between the transceivers and the coexistence processor.

The methods and systems described herein can be used at the different operational stages of the WLAN, WiMAX and Bluetooth links, such as during steady-state operation, during handover and during link set-up stages. Although the embodiments described hereinbelow mainly refer to the coordination of WLAN, WiMAX and Bluetooth, the methods and systems described herein can also be used for coordination of WiMAX and Bluetooth links in a dual-function terminal, as well as for coordination of other long-range base station communication protocols with local, short-range protocols.

System Description

Figure 1:
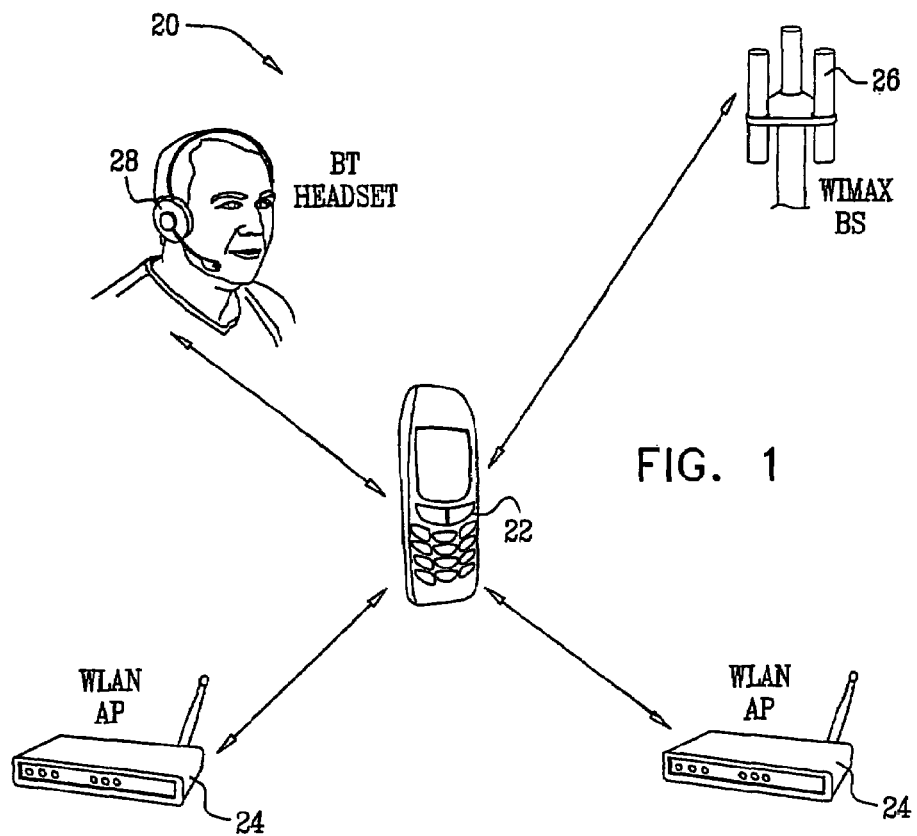
FIG. 1 is a schematic, pictorial illustration showing a system for wireless communications, in accordance with an embodiment of the present invention.

FIG. 1 is a schematic, pictorial illustration of a wireless communication system 20, in accordance with an embodiment of the present invention. In system 20, a wireless terminal 22 communicates with one or more WLAN access points (APs) 24 and one or more WiMAX base stations (BSs) 26. In some scenarios, terminal 22 may access the Internet and various network services over either a WLAN or a WiMAX link, and may be handed over from WLAN to WiMAX, and vice versa.

In parallel to communicating with the WLAN and/or WiMAX network, terminal 22 communicates over a Bluetooth link with a peripheral device, such as a headset, a hands-free kit, a personal computing device or any other suitable Bluetooth-enabled device. In the present example, terminal 22 communicates with a Bluetooth-enabled headset 28.

Although FIG. 1 shows a certain type of wireless terminal by way of illustration, the embodiments described hereinbelow are applicable to any type of wireless computing and/or communication device that has the appropriate communication capabilities. The term "wireless terminal" as used in the present patent application and in the claims should therefore be understood broadly to refer to any and all suitable sorts of consumer electronics, computing and communication devices in which the principles of the present invention may be implemented. The wireless terminal may be mobile, portable, nomadic or fixed.

Typically, the WiMAX network to which terminal 22 is connected is a long-range, wide-area network (WAN) having wide geographic coverage. The WLAN network, on the other hand, is usually a local-area network having smaller coverage areas, often referred to as "hotspots." The WLAN hotspots are usually contained within the coverage area of the WiMAX network.

In some scenarios, terminal 22 communicates with both the WLAN and WiMAX networks simultaneously. A typical scenario occurs during handover from one network to the other. In order to ensure a smooth handover, the terminal initiates communication with the network it is about to join before it terminates the connection with the network it is about to leave. Thus, during a certain time interval, the terminal communicates with both networks simultaneously.

Other scenarios in which the terminal communicates with both networks simultaneously occur when the terminal scans one network while communicating with another. For example, the terminal may scan the WLAN while communicating with the WiMAX BS, in order to check whether high-bandwidth communication with the WLAN is available.

In parallel to WLAN and/or WiMAX operation, terminal 22 communicates with headset 28 over a Bluetooth link. For example, when the terminal is engaged in a voice call over either the WLAN or the WiMAX network, the voice is transmitted to and from headset 28. As another example, terminal 22 may be engaged in a data session, such as a Voice over IP (VoIP) session, over the WLAN or the WiMAX network, with the session being relayed to an adjacent laptop or other computing device using a Bluetooth link.

In all of these scenarios, as well as various other possible scenarios, there are occasions when all three communication connections (WiMAX, WLAN and Bluetooth) are being used simultaneously. For example, the terminal may be handed over from the WLAN to the WiMAX network or vice versa, during a voice call that uses headset 28. At other times, the terminal may hold a call over one network, relay the voice or data of the call to the Bluetooth device, while simultaneously scanning the other network.

Thus, there exist various scenarios in which terminal 22 communicates over the WLAN, the WiMAX network and the Bluetooth link simultaneously. On the other hand, all three protocols often operate in similar, sometimes overlapping frequency bands, such as in the 2.3-2.5 GHz band. Unless strictly coordinated, WLAN, WiMAX and Bluetooth transmissions may severely interfere with one another, especially when their transmitters and receivers are collocated in a single communication terminal.

Interference would occur, for example, if the terminal were to transmit using two or more different protocols at the same time, or transmit using one protocol while attempting to receive using another protocol. The methods and systems described herein coordinate the timing of transmission and reception of terminal 22 over the WLAN, WiMAX and Bluetooth links. As a result, wireless terminal 22 is able to communicate with WLAN AP 24, WiMAX BS 26 and Bluetooth 28 simultaneously without mutual interference.

As will be shown below, terminal 22 communicates over a single link out of the three at any given time. The simultaneous operation of the different protocols is carried out by using the different protocols in alternate time slots in a coordinated manner. Thus, the term "simultaneous communication," as used in the present patent application and in the claims, refers to the ability to maintain simultaneous and uninterrupted communication connections, processes or sessions over the WiMAX, WLAN and Bluetooth links, without mutual interference among these processes.

Figure 2:
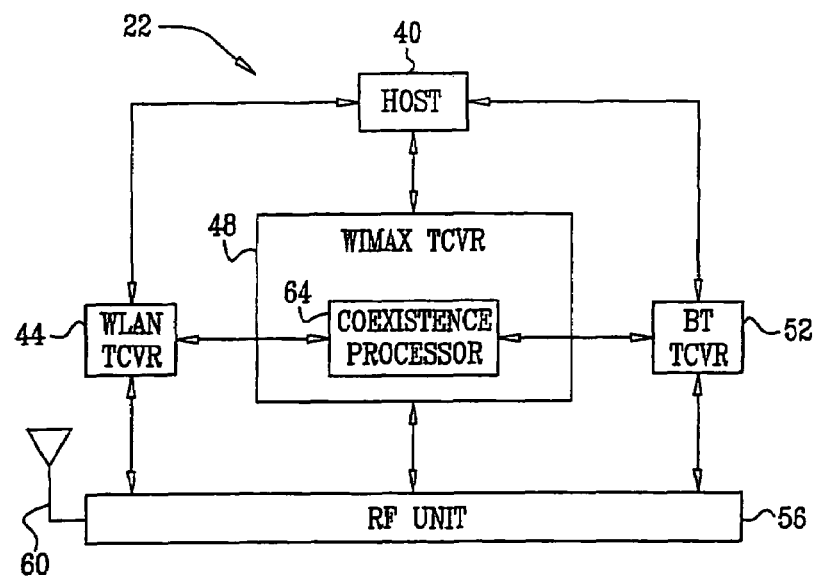
FIG. 2 is a block diagram that schematically shows elements of a multi-function wireless terminal, in accordance with an embodiment of the present invention.

FIG. 2 is a block diagram that schematically shows elements of wireless terminal 22, in accordance with an embodiment of the present invention. Terminal 22 comprises a host processor 40, which is connected to a WLAN transceiver 44, a WiMAX transceiver 48 and a Bluetooth transceiver 52. Transceivers 44, 48 and 52 respectively carry out the WLAN, WiMAX and Bluetooth baseband processing functions. All three transceivers are connected to a radio frequency (RF) unit 56, which comprises the RF receiver and transmitter circuitry for transmitting and receiving the signals of the different protocols. RF unit 56 is connected to an antenna 60, which transmits and receives RF signals of the three protocols to and from the WLAN AP, WiMAX BS and Bluetooth peripheral device.

The terminal comprises a coexistence processor 64, which coordinates and synchronizes the WLAN, WiMAX and Bluetooth communication of terminal 22. In the example of FIG. 2, processor 64 is part of WiMAX transceiver 48. Alternatively, the coexistence processor may comprise a separate unit, or be integrated with any other component of terminal 22.

The configuration of terminal 22 shown in FIG. 2 is an exemplary configuration, which is shown purely for the sake of conceptual clarity. The methods and systems described herein are applicable in any other suitable terminal configuration. For example, the WLAN, WiMAX and Bluetooth transceivers may comprise separate devices or be integrated into a single device. The RF unit may comprise a single module that serves all three protocols, or may comprise three separate RF modules, one module for serving each protocol. Further alternatively, the terminal may comprise three separate RF/baseband units, each serving a single protocol and comprising both baseband and RF elements. Regardless of the specific configuration of terminal 22, the three transceivers can be viewed collectively as a single baseband processing circuit, which carries out the baseband functions of coordinated WLAN, WiMAX and Bluetooth operation.

In some embodiments, the terminal may comprise known WLAN and Bluetooth baseband transceivers that use a known WLAN/Bluetooth coordination scheme, such as the schemes cited in the Background section above. These coordination schemes typically synchronize the WLAN and Bluetooth protocols using proprietary interfaces between the WLAN and Bluetooth baseband transceivers. In these embodiments, coexistence processor 64 can be connected between the WLAN and Bluetooth transceivers, as shown in FIG. 2, and be configured to emulate the proprietary interfaces between them. Using this configuration, WLAN, WiMAX and Bluetooth coordination can be implemented substantially without modification to the WLAN and Bluetooth transceivers.

The WLAN, WiMAX and Bluetooth transceivers may be implemented in hardware, such as using one or more application-specific integrated circuits (ASICs). Some baseband functions may also be implemented in software. The RF unit may be implemented using radio frequency integrated circuits (RFICs) and/or discrete components. In some embodiments, coexistence processor 64 may comprise a general-purpose processor, which is programmed in software to carry out the functions described herein. The software may be downloaded to the processor in electronic form, such as over a network. Alternatively, the functions of processor 64 may be implemented in hardware, or using a combination of hardware and software elements.

In some cases, some of the circuitry of RF unit 56 can be shared between two or more of the WLAN, WiMAX and Bluetooth transceivers. Alternatively, each transceiver may use its own dedicated RF hardware. Some aspects of sharing the transceiver resources of a wireless terminal among different protocols are described, for example, in a U.S. patent application entitled "Dual-Function Wireless Data Terminal," filed Dec. 12, 2006, which is assigned to the assignee of the present patent application and is incorporated herein by reference.

Coexisting Bluetooth, WiMAX and WLAN Slot Allocations

In order to avoid interference between the WLAN, WiMAX and Bluetooth transmission and reception, terminal 22 transmits and receives in a predefined sequence of time slots, which is described in detail below.

For the sake of clarity, the description initially addresses steady-state operation, in which the terminal has already established its connection with the appropriate WLAN AP, WiMAX BS and Bluetooth device. The methods and systems described herein are nevertheless applicable to other operational modes of the three standards. Variations and applicability to other operational modes and processes, such as various link establishment procedures, are addressed further below.

Figure 3:
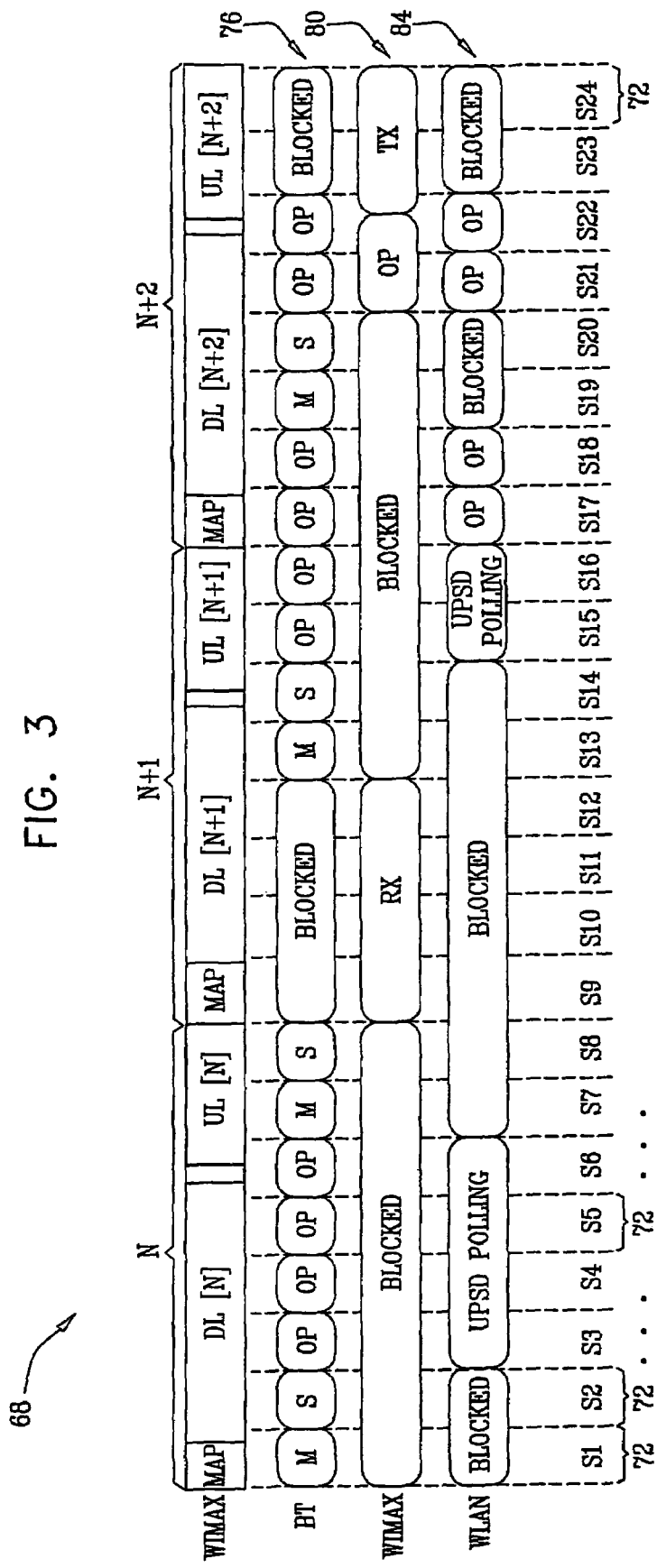
FIG. 3 is a diagram showing coexisting allocations of Bluetooth, WiMAX and WLAN time slots in a multi-function wireless terminal, in accordance with an embodiment of the present invention.

FIG. 3 is a diagram showing coexisting allocations of Bluetooth, WiMAX and WLAN time slots in terminal 22, in accordance with an embodiment of the present invention. When the WiMAX, WLAN and Bluetooth links are already established, Bluetooth operation is assumed to use the High-quality Voice 3 (HV3) Synchronous Connection-Oriented (SCO) mode, as defined in the Bluetooth standard cited above. WLAN operation is assumed to use the Unscheduled Power Save Delivery (UPSD) mode, as defined in the IEEE 802.11 standard.

Terminal 22 communicates in accordance with a super-frame 68, which is repeated cyclically. Super-frame 68 comprises twenty-four time slots 72, denoted S1 . . . S24. Each time slot 72 is 625 µS long, a duration that is selected to match the 625 µS duration of Bluetooth time slots. Each super-frame is 15 mS long. The 15 mS duration of the super-frame is selected because it corresponds to twenty-four Bluetooth slots, as well as to three 5 mS WiMAX frames. The three WiMAX frames in the super-frame are denoted N, N+1 and N+2.

Some of time slots 72 are reserved for a particular link out of the WiMAX, WLAN and Bluetooth links. Other time slots are defined as bandwidth opportunities, or optional slots, in which the terminal can communicate using one of the links, as long as no other link already uses the slot.

In some cases, the individual WLAN, WiMAX and/or Bluetooth transceivers may not be aware of the structure of the super-frame shown in FIG. 3. In these cases, the individual transceivers are controlled on a slot-by-slot basis by processor 64, which coordinates their transmission and reception periods according to the super-frame structure. In order to align the timing of all three transceivers, the time base of the WiMAX transceiver is used as a reference, and the time bases of the Bluetooth and WLAN transceivers are configured to track it.

The coexistence processor enables each transceiver to use its designated time slots using "busy" interfaces or lines, also referred to herein as coexistence interfaces. In each time slot 72, the coexistence processor indicates to each transceiver whether the current slot is free or busy using this interface. Processor 64 may indicate to a particular transceiver that a slot is busy either when the super-frame structure defines the slot as blocked for use in the particular protocol, or when the slot is an optional slot that was already seized by another transceiver. The processor may schedule the use of optional time slots among the transceivers using a Round-Robin priority mechanism or using any other suitable method.

When a particular transceiver requests to communicate, it polls its "busy" interface in order to determine whether it is allowed to use the current time slot. If allowed, the transceiver in question sets the interface to "busy." When the transmission is complete, the transceiver releases the interface.

A slot allocation 76 defines the time slots assigned to Bluetooth operation. The assignment of Bluetooth slots takes precedence over the other two protocols. Bluetooth slots are defined at frequent, regular intervals, since the Bluetooth protocol has little flexibility in defining slot patterns. Moreover, precedence is given to Bluetooth transmissions in order to reduce the latency and jitter of the voice carried over the Bluetooth link.

In the Bluetooth link configuration, terminal 22 (or, more specifically, the Bluetooth transceiver of terminal 22) is assumed to be the master and headset 28 is assumed to be the slave, so that the timing of the Bluetooth link can be determined by terminal 22. Being the master, terminal 22 controls the timing of the Bluetooth slots and aligns them with the timing of the super-frame. When the Bluetooth link is initially set up with the headset being the master, the master and slave roles can be reversed using master-slave switching (MSS) or link disconnect/connect procedures, which are defined in the Bluetooth standard.

In the Bluetooth SCO HV3 mode, terminal 22 and headset 28 transmit and receive in adjacent time slots. In the present example, each side of the Bluetooth link transmits once every six time slots. The terminal transmits to the headset in slots S1, S7, S13 and S19 marked as "M," and the headset transmits to the terminal in slots S2, S8, S14 and S20 marked as "S." Slots S9 . . . S12 and S23 . . . S24 are blocked for Bluetooth operation, in order to enable access to the other protocols.

Slots S3 . . . S6, S15 . . . S18 and S21 . . . S22 are defined as optional bandwidth opportunities, or optional slots, in which Bluetooth information can be transmitted if the slot is free. The optional slots can be used, for example, for non-voice information, such as for exchanging data packets with an additional Bluetooth-enabled laptop computer.

A slot allocation 80 defines the time slots assigned to WiMAX operation. In WiMAX, downlink and uplink bandwidth (i.e., WiMAX subcarriers and symbol intervals) is allocated using a MAP message, which is transmitted by the WiMAX BS at the beginning of each WiMAX frame. The MAP message comprises downlink MAP and uplink MAP messages. The downlink MAP allocates bandwidth in the current WiMAX frame, whereas the uplink MAP allocates bandwidth in the next frame. For example, the MAP message transmitted in the WiMAX frame denoted N+1 allocates the downlink bandwidth of frame N+1 and the uplink bandwidth of frame N+2.

The super-frame structure is defined so that the terminal is able to receive MAP messages from the BS. Furthermore, time slots for WiMAX uplink transmission are allocated so that they coincide with the uplink periods of the WiMAX frames.

In the present example, slots S9 . . . S12 of each super-frame are allocated for WiMAX downlink operation (WiMAX reception at the terminal). As can be seen in FIG. 3, these slots correspond to the first 2.5 mS of WiMAX frame N+1. The terminal is able to receive the MAP message transmitted in frame N+1, as well as data bursts, during this 2.5 mS period. Since the downlink MAP defines allocations for the current frame, the BS is expected to send any data bursts addressed to terminal 22 during the first 2.5 mS of the second frame of the super-frame.

In some embodiments, the WiMAX BS is aware of the fact that terminal 22 is a multi-function terminal that operates in accordance with a 15 mS super-frame structure. The BS is also aware of the timing of the super-frame, and transmits bandwidth allocations for this terminal only in the MAP messages of the second WiMAX frame in each super-frame. In particular, the BS sends uplink allocations for frame N+2 in the MAP message of frame N+1. Therefore, the end portion of frame N+2 (i.e., slots S23 and S24, and sometimes some or all of slots S21 and S22) are allocated to possible WiMAX uplink operation (WiMAX transmission from the terminal). Note that the beginning of the interval reserved for WiMAX uplink does not necessarily coincide with the timing of slots 72.

Slots S1 . . . S8 and S13 . . . S20 (i.e., WiMAX frame N, the second half of frame N+1 and the first half of frame N+2) are blocked to WiMAX operation, and the BS is assumed to be aware of these blocked time intervals. Thus, the BS refrains from transmitting downlink data and allocating uplink bandwidth to the terminal during these periods.

In alternative embodiments, the WiMAX BS need not be aware of the super-frame structure and timing used by terminal 22. For example, the terminal (or, more specifically, the WiMAX transceiver of the terminal) may switch to sleep mode during the periods that are blocked to WiMAX operation, and notify the BS of this fact. The terminal can use class 2 sleep mode, as defined in the IEEE 802.16e standard, for this purpose.

A slot allocation 84 defines the time slots assigned to WLAN operation. The WLAN connection between terminal 22 and AP 24 is assumed to use the UPSD mode. Operation in the UPSD mode is chosen because it gives the terminal control over the timing of transmission and reception, thus enabling the terminal to coordinate the timing of its WLAN link with the timing of the Bluetooth and WiMAX links.

In the UPSD mode, the terminal (or, more specifically, the WLAN transceiver of the terminal) is in sleep mode by default. The terminal controls the timing in which it wakes up, transmits, receives and returns to sleep. Whenever the terminal wakes up to transmit an uplink transmission, it polls the WLAN AP in order to receive any pending downlink data. If the pending downlink data exceeds the capacity of the allocated time slots, the terminal receives and acknowledges only part of the data. The terminal typically signals the AP to stop sending additional downlink data by refraining from sending uplink acknowledgments. The unacknowledged data is buffered by the AP until bandwidth is available. The terminal can also wake up in order to synchronize with the AP and to transmit and receive WLAN management traffic.

As can be seen in the figure, slots S3 ... S6 and S51 ... S16 are dedicated to WLAN uplink and downlink operation. Slots S17 ... S18 and S21 ... S22 are defined as optional bandwidth (OP) slots. Slots S1 ... S2, S7 ... S14, S19 ... S20 and S23 ... S24 are blocked to WLAN operation.

The super-frame structure shown in FIG. 3 is an exemplary structure. Any other suitable slot allocation, which gives a first precedence to the Bluetooth link and assigns WiMAX slots that coincide with the uplink and downlink regions of the WiMAX frames, can also be used.

Figure 4:
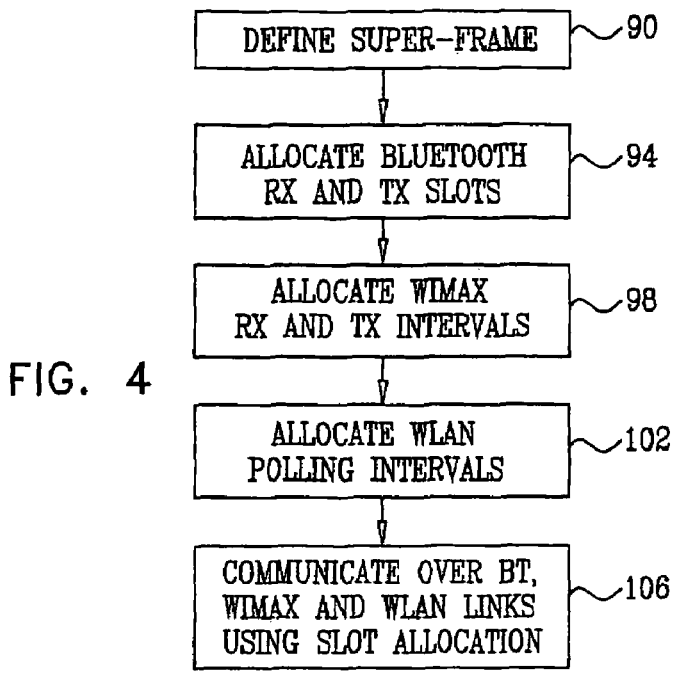
FIG. 4 is a flow chart that schematically illustrates a method for multi-function communication in a wireless terminal, in accordance with an embodiment of the present invention.

FIG. 4 is a flow chart that schematically illustrates a method for multi-function communication in wireless terminal 22, in accordance with an embodiment of the present invention. The method begins by predefining the super-frame structure, at a frame definition step 90. Terminal 22 and sometimes WiMAX BS 26 are notified of the super-frame structure.

Coexistence processor 64 in terminal 22 carries out the allocation of the different slot types. Processor 64 allocates transmit and receive slots for the Bluetooth link, at a Bluetooth allocation step 94. The processor allocates WiMAX uplink and downlink slots, at a WiMAX allocation step 98, and WLAN polling slots, at a WLAN allocation step 102.

Using the allocated slots, terminal 22 communicates simultaneously and without mutual interference with AP 24, BS 26 and headset 28 over the WLAN, WiMAX and Bluetooth links, respectively, at a communication step 106.

Bluetooth Link Establishment

The description above addressed the steady-state situation, in which the WiMAX, WLAN and Bluetooth links are already established. The description that follows describes the operation of terminal 22 during the establishment, or set-up, of the Bluetooth link. As noted above, the Bluetooth protocol is relatively inflexible in terms of slot patterns. Therefore, precedence is typically given to this link, and the WiMAX and WLAN links use the remaining time resources.

Figure 5:
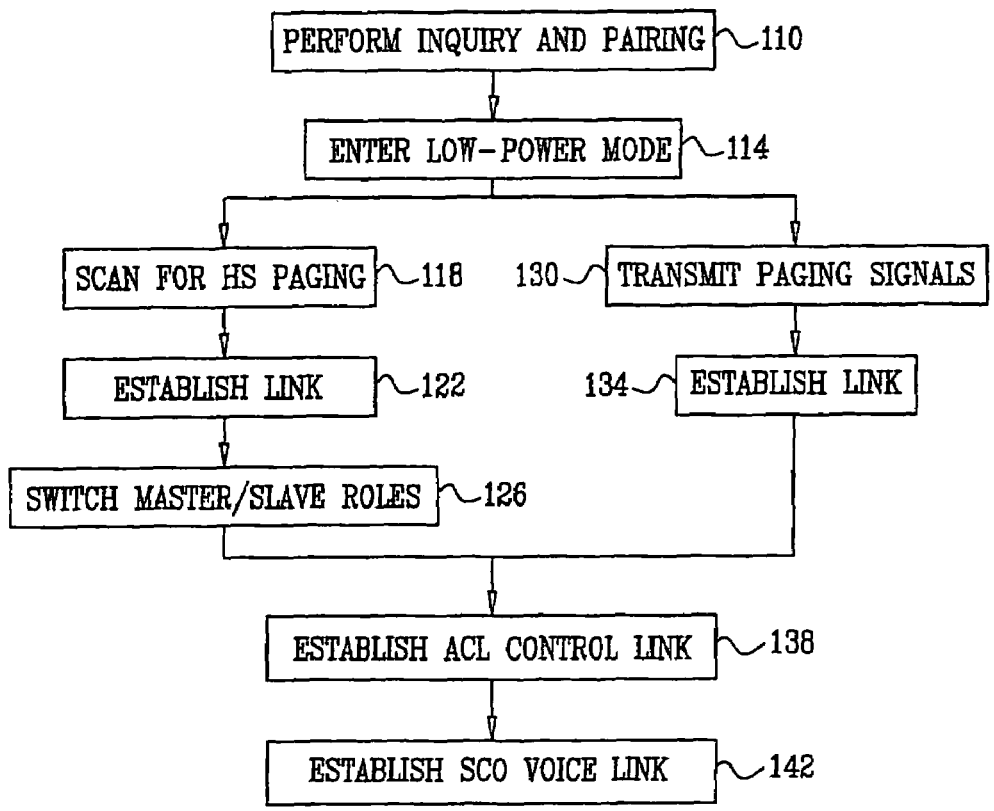
FIG. 5 is a flow chart that schematically illustrates a method for Bluetooth link establishment, in accordance with an embodiment of the present invention.

FIG. 5 is a flow chart that schematically illustrates a method for Bluetooth link establishment, in accordance with an embodiment of the present invention. The method begins with the Bluetooth transceiver in terminal 22 initiating an inquiry procedure, as defined in the Bluetooth standard, at an inquiry step 110. The inquiry procedure attempts to discover the Bluetooth-enabled devices in the vicinity of the terminal. In some cases, once one or more Bluetooth-enabled devices are discovered, the user typically selects a particular device with which to pair.

According to the inquiry procedure, the terminal sends trains of identification (ID) packets on several Bluetooth frequencies, in order to discover neighboring Bluetooth devices, without prior knowledge of their timing and hopping sequences. Each ID packet train comprises an alternating sequence of transmit and receive 625 µS time slots. The sequence has a nominal duration of 10.24 sec.

Coexistence processor 64 coordinates the transmission of the ID packet trains with the WiMAX operation of the terminal, in order to prevent the WiMAX link from being dropped, and to prevent the terminal from missing responses from the discovered Bluetooth devices. It is assumed that during terminal-initiated Bluetooth inquiry, the WiMAX applications running in the terminal are either idle or can tolerate temporary link suspension, as long as the link does not drop.

In some embodiments, the coexistence processor synchronizes the timing of the Bluetooth slots used for inquiry with the timing of the WiMAX frames. Since the terminal initiates the inquiry, procedure, it is free to choose the timing of its transmission and reception. Synchronizing the Bluetooth slots and WiMAX frames is performed so that the terminal is able to occasionally receive downlink transmissions from the WiMAX BS during the 10.24 sec inquiry procedure. The terminal is thus able to maintain synchronization with the WiMAX BS and to perform on-going channel measurements, such as Carrier to Interference and Noise Ratio (CINR) measurements.

For example, the coexistence processor may set the timing of the Bluetooth inquiry process, so that the beginning of each WiMAX frame coincides with a Bluetooth receive slot. Such synchronization is possible because a 5 ms WiMAX frame has the same length as eight 625 µS Bluetooth slots. Given this synchronization, the terminal is able to receive the first six symbols of the WiMAX frame, which include the downlink preamble. The terminal uses the received preamble to maintain its synchronization with the WiMAX BS.

In some embodiments, the terminal can define certain WiMAX frames as periods of reduced availability, and notify the BS that the terminal will be unable to participate in active WiMAX communications during these frames. Other frames are defined as having full availability, during which the WiMAX link has precedence over the Bluetooth link. For example, the terminal can have reduced availability for two successive WiMAX frames, followed by two frames of availability, and so on.

It is usually advantageous to define the period of full availability as lasting at least two WiMAX frames because, as noted above, uplink resources are allocated by the BS MAP message one frame in advance. The terminal sends a reduced availability message to the WiMAX BS, notifying the BS that it will not be able to communicate during a certain number of frames. The terminal can use several alternative methods for coordinating the reduced availability periods with the BS, such as by entering sleep mode, using handover scanning messages or using newly-defined MAC management messages. These methods are described in greater detail further below.

Since the WiMAX link takes precedence two full-availability WiMAX frames at a time, between two and four Bluetooth transmit slots may be lost during this period. In order to compensate for this loss, the repetition factor of the Bluetooth inquiry transmissions can be increased.

According to the Bluetooth standard, responses from discovered Bluetooth devices are delayed by a random back-off. During periods of full WiMAX availability, the Bluetooth transceiver refrains from transmitting, but can keep its receiver activated to receive these delayed responses.

Following the inquiry/pairing procedure, terminal 22 and headset 28 enter a low-power mode, at a low-power operation step 114. In the low-power modes, the link remains idle until the terminal or the headset have information to transfer. In some embodiments, the Bluetooth link is idle, and performs no communication between the terminal and the headset. In other cases, the terminal and headset perform occasional transmissions in order to maintain its synchronization, so that the link is ready to become active when needed.

For example, the link may enter a park mode, as defined in the Bluetooth standard. In park mode, assuming terminal 22 is defined as the master, the terminal periodically sends broadcast beacon frames to the headset, in order to maintain its synchronization. These broadcast frames are given priority over the WiMAX transmission and reception.

Alternatively, the link may enter a sniff mode, as defined in the Bluetooth standard. In sniff mode, again assuming terminal 22 is the master, the terminal maintains synchronization with the headset by performing occasional, relatively infrequent polling of the headset. Operation in sniff mode is similar to ACL mode operation, as described below.

Note that low-power modes are not necessarily supported by all Bluetooth-enabled terminals. Therefore, low-power operation step 114 may be omitted in some cases. In general, however, it is usually advantageous to reduce the time needed for link establishment by employing the sniff or park modes, in order to reduce the probability of interference between the Bluetooth and WiMAX links.

Establishment of an active Bluetooth link can be initiated by terminal 22 or by headset 2B. Steps 118-126 below refer to headset-initiated link establishment, while steps 130-134 below refer to terminal-initiated link establishment.

Bluetooth transceiver 52 in terminal 22 may initiate a page scan procedure, as defined in the Bluetooth standard, in order to detect link establishment attempts initiated by neighboring Bluetooth devices, at a page scan step 118. In a typical page scan procedure, the Bluetooth transceiver activates its receiver for a scan window of 32 Bluetooth slots, i.e., for 20 ms, corresponding to four WiMAX frames. The terminal opens a scan window periodically, every 1.28-2.56 seconds.

In some embodiments, coexistence processor 64 synchronizes the page scan windows with the WiMAX frames. The synchronization prevents WiMAX transmissions of the terminal from interfering with Bluetooth reception. The synchronization also prevents interference to WiMAX reception, which may be caused by Bluetooth transmissions that are part of the link establishment, once the page scan is successful.

In some cases, the WiMAX connections that are active in terminal 22 during the Bluetooth page scan procedure do not have real-time requirements. Such connections may comprise, for example, Non-Real-Time Polling Service (nrtPS) or Best Effort (BE) basic service connections. In these cases, the terminal can suspend the WiMAX traffic flow for the duration of the scan, such as by entering a reduced availability period using any of the techniques described above. The reduced availability parameters requested from the BS should ensure that active periodic control loops continue to operate with a higher priority over the Bluetooth page scan.

In other cases, the active WiMAX connections comprise real-time connections such as Unsolicited Grant Service (UGS), Real Time Polling Service (rtPS) and Extended Real Time Polling service (ertPS) connections. In these cases, the WiMAX transmissions associated with the real-time connections can be given priority over the Bluetooth page scan. The duration of the page scan can be increased to compensate for Bluetooth slots and/or frequencies that may be blocked by the WiMAX transmissions.

In some embodiments, the frequencies used for reception in the Bluetooth page scan procedure can be determined in coordination with the WiMAX transmission frequencies, so that both can coexist simultaneously without interruption of the page scan. This technique reduces the time duration in which the Bluetooth receiver is active, and thus extends the battery life of the terminal.

For example, coexistence processor 64 can synchronize the timing of page scan window with the beginning of the WiMAX frames. The coexistence processor monitors the WiMAX transmission frequencies being used, and selects Bluetooth scan frequencies that are expected to have low interference from the WiMAX transmissions. The duration of the page scan window can be adjusted so that, over time, all Bluetooth paging frequencies are scanned.

In order to further improve the reliability of the page scan procedure, the terminal can cause the Bluetooth device (e.g., headset 28) to increase its page repetition frequency. For example, the terminal can report a page scan mode R1 or R2 in the SR field of the Frequency Hopping Synchronization (FHS) packets it transmits to the Bluetooth device. This method can also be applied as part of a terminal-initiated paging procedure.

If the page scan procedure is successful, i.e., if the terminal receives a page transmission from a neighbor Bluetooth device, a Bluetooth link is established between them, at a headset-initiated link establishment step 122. The link establishment procedure has a typical length of approximately 3.75 ms, during which the Bluetooth link is usually given priority over the WiMAX link.

When the headset-initiated link establishment procedure is completed, the link is set up with the headset as the master and the terminal as the slave. As noted above, such a situation does not enable the coexistence processor to synchronize the timing of the Bluetooth link to the WiMAX frames, and should therefore be avoided. Thus, the terminal initiates a procedure that reverses the master-slave roles, at a master-slave reversal step 126. In some embodiments, the terminal can reverse the master-slave roles and become the master by aborting the link establishment procedure immediately after receiving an FHS packet from headset 28, a message that contains the Bluetooth address of the headset.

Following reception of the FHS packet, and typically after a delay of at least four slots, the terminal transmits a page to headset 28, using the address extracted from the FHS message, at a high repetition factor. This technique assumes that the headset is configured to enter the page scan mode in response to the terminal aborting the link establishment procedure. In such a case, the page transmitted by the terminal will be successfully received by the headset, resulting in a Bluetooth link in which the terminal is the master.

Alternatively, the terminal can use any other suitable method for reversing the master-slave roles of the terminal and the headset, such as the MSS feature defined in the Bluetooth standard, provided the particular headset supports this feature.

When the link establishment procedure is initiated by terminal 22, Bluetooth transceiver 52 initiates a paging procedure in order to establish a Bluetooth link with headset 28, at a paging step 130. As defined in the Bluetooth standard, the terminal sends trains of ID packets on a subset of the Bluetooth frequencies, attempting to contact the headset.

The duration of the ID packet train is thirty-two Bluetooth slots, i.e., 20 ms. The train is repeated at least 128 times in the R1 page scan mode and at least 256 times in the R2 page scan mode. The total duration of the ID packet train can thus reach up to 2.56 seconds in the R1 mode and 5.12 seconds in the R2 mode. The page procedure is repeated until successful completion (i.e., until the headset responds with an ID packet) or until the maximum duration of the page elapses.

In some embodiments, coexistence processor 64 coordinates the page transmissions with the WiMAX operation of terminal 22. The coordination prevents the transmitted Bluetooth ID packets from blocking the WiMAX downlink reception, and also prevents WiMAX uplink transmission from blocking the reception of page responses (ID packets) from the headset.

For example, the terminal may first establish a Bluetooth link with the headset, and only then proceed to establishing an actual voice connection over the WiMAX link. This order enables alerting the user via headset 28 over the Bluetooth link (e.g., by playing a suitable dial tone), while avoiding interference to the WiMAX link from the Bluetooth paging procedure.

Similarly to the mechanism used in the inquiry procedure described in step 110 above, the terminal may synchronize the paging transmissions with the WiMAX frames by (1) synchronizing the Bluetooth slots with the beginning of the WiMAX frame and (2) using a repetitive pattern of reduced availability and full availability WiMAX frames. As described above, the terminal can have reduced availability for two successive WiMAX frames, followed by two frames of full availability, and so on. During the full-availability frames, the WiMAX link is given priority over the Bluetooth link. Because of the reduced-availability frames, up to eight Bluetooth transmit slots may be lost in each four-frame period.

The terminal can notify the BS of the periods of reduced availability using any suitable method, such as by entering sleep mode, using handover scanning or using a newly-defined MAC management message. These methods are described further below.

When headset 28 successfully receives a page transmission from terminal 22, the headset responds and a link establishment procedure is initiated, at a terminal-initiated link establishment step 134. As described above, link establishment usually spans six Bluetooth slots, i.e., 3.75 ms. Typically, the Bluetooth link is given priority over the WiMAX link during this procedure, by allowing Bluetooth transmissions and avoiding WiMAX uplink transmissions.

Having established a Bluetooth link, initiated either by terminal 22 or by headset 28, the terminal and headset first communicate using an Asynchronous Connectionless Link (ACL) mode, as defined in the Bluetooth standard, at an ACL communication step 138. Unlike the SCO mode, which is a connection-oriented mode that is typically used for transferring voice, the ACL mode is a connectionless, packet-switched mode that is used primarily to transfer packet data. The ACL communication at step 138 is typically used for negotiating the parameters of an SCO voice link to be set up.

The ACL link may be established with terminal 22 serving as the master, such as when the link is initiated by a paging procedure executed by the terminal. In this case, the timing of the Bluetooth link is controlled by the terminal. Since the ACL mode does not reserve transmission slots, the coexistence processor can assign Bluetooth slots to the ACL link as needed, as long as the slots are not used by the WiMAX or WLAN links. Coexistence processor 64 can assign the Bluetooth slots using the "busy" interface with the Bluetooth transceiver. The WiMAX frames and the Bluetooth ACL slots are synchronized, so that the beginning of each WiMAX frame coincides with a Bluetooth transmission slot.

Alternatively, an ACL link may be established with terminal 22 serving as the slave and headset 28 serving as the master, such as when the link is initiated by a paging procedure executed by the headset. As noted above, when the Bluetooth link is initially established with terminal 22 as the slave, the terminal initiates a master-slave switching (MSS) procedure in order to become the master. If the headset does not support MSS, the terminal may abort the link establishment procedure and begin paging the headset, similarly to the role-reversal method in the page scan procedure. As a result, the link is re-established with terminal 22 as master.

Since establishing the Bluetooth link with the headset as master usually results from an action performed by the user (e.g., switching on a Bluetooth-enabled headset), it is desirable to reduce the length of the procedure. Thus, the Bluetooth link is typically given priority over the WiMAX link. In other words, until the link is established, the coexistence processor prevents the slots allocated to the Bluetooth link from being used by the WiMAX link.

Having negotiated the SCO link parameters, the terminal and headset establish an SCO link, at an SCO link establishment step 142. Communication at this stage is typically performed in accordance with the super-frame structure of FIG. 3 above.

In some cases, however, the terminal may continue to operate in the ACL mode, in which case step 142 is omitted. Such a scenario may occur, for example, when the Bluetooth link is used for relaying data rather than voice, such as when the Bluetooth-enabled device comprises a computing device that communicates with terminal 22.

Alternatively, the ACL mode can be used to exchange packetized voice between the terminal and the headset. For example, the data packets exchanged in the ACL mode may comprise VoIP packets or packets that carry voice using any other suitable encapsulation method or protocol.

Coordination of Reduced Availability Periods

As noted above, in some of the link establishment procedures, the terminal defines certain WiMAX frames as reduced availability frames, and provides this information to the WiMAX BS. The BS takes this information into account and refrains from sending MAP messages and downlink data to the terminal during these frames. Several methods can be employed by the terminal in order to coordinate the reduced availability periods with the BS. Reduced availability notification methods are also described in the U.S. patent application "Dual-Function Wireless Data Terminal," cited above.

For example, when both the terminal and BS support Power Saving Class type 2, as defined in the IEEE 802.16e standard, the terminal can send a sleep mode request (SLP-REQ) message to the BS, indicating that it intends to enter sleep mode in a particular frame. The BS responds with a SLP-RESP message. In some embodiments, an additional information element can be added to the SLP-REQ message, in order to indicate to the BS that the sleep mode request is related to a coexistence scenario. The new information element is typically encoded as a type-length value (TLV) field.

SLP-REQ and SLP-RESP messages are associated with the individual transport connections that are currently supported by the terminal, and not with the terminal as a whole. The connections may be grouped according to Paging Saving Classes. When the terminal has a large number of connections, the sleep request messages may become long and may consume significant air interface resources.

In an alternative embodiment, the terminal may coordinate reduced availability frames with the BS using handover scanning messages. The terminal can transmit a scan request (MOB-SCN-REQ) message, requesting the BS to allow it a predetermined time interval to scan for an alternative BS. The BS responds with a MOB-SCN-RESP message that indicates the allocated scanning time interval. During the allocated scanning interval, the BS refrains from sending downlink data to the terminal, since it assumes that the terminal is engaged in receiving another BS.

For example, when the Bluetooth link used by the terminal is an SCO link, the terminal can request an allocation of a scanning interval having a duration of one frame, an interleaving interval of two frames, and a scan iteration value set to zero (i.e., indefinitely).

As in sleep mode operation, an additional TLV-encoded information element can be added to the MOB-SCN-REQ message, in order to indicate to the BS that the scan request is related to a coexistence scenario.

Further alternatively, the terminal may coordinate the reduced availability frames with the BS by defining dedicated 802.16 management messages, denoted COEXIST-REQ and COEXIST-RESP. The COEXIST-REQ message, which should be supported by the BS, requests that the BS refrain from communicating with the terminal during a particular time period due to a coexistence event.

WiMAX-WLAN Handover Scenarios

Methods for handing over a wireless terminal between a WLAN and a WiMAX network are described, for example, in the U.S. patent application "Dual-Function Wireless Data Terminal," cited above. The following description addresses the coordination of handover procedures in terminal 22 from the WLAN to the WiMAX network or vice versa, with a possibly-active Bluetooth link.

Figure 6:
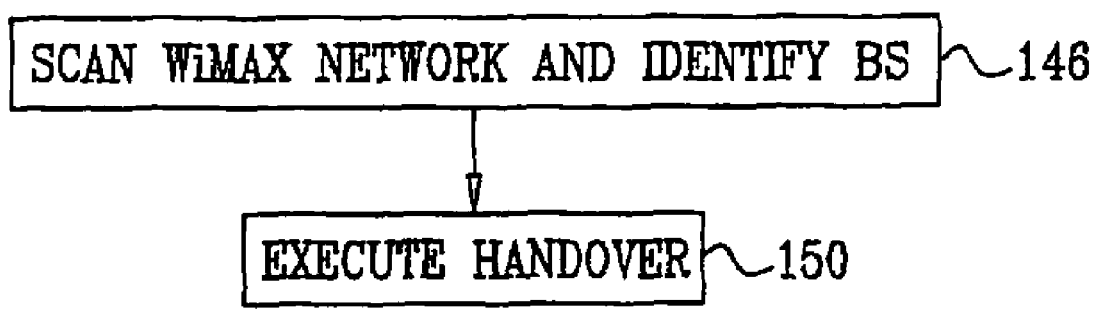
FIG. 6 is a flow chart that schematically illustrates a method for handing over a wireless terminal from a WLAN to a WiMAX network, in accordance with an embodiment of the present invention.

FIG. 6 is a flow chart that schematically illustrates a method for handing over terminal 22 from the WLAN to the WiMAX network in the presence of a Bluetooth link, in accordance with an embodiment of the present invention. The method begins with terminal 22 performing a WiMAX scanning procedure, at a WiMAX scanning step 146. The WiMAX scanning procedure attempts to identify a WiMAX BS with which it is able to communicate. WiMAX scanning is often performed while the terminal is actively communicating over the WLAN link. Assuming a suitable WiMAX BS is identified, the terminal registers with the identified BS, preferably while maintaining its WLAN sessions active. The handover in from WLAN to WiMAX is generally time-critical, since the WLAN the terminal may rapidly roam out of the WLAN coverage area and drop the WLAN link.

In WiMAX scanning, the terminal passively receives and performs measurements on the transmissions of the WiMAX BS. These reception periods should be coordinated with the WLAN and Bluetooth transmissions of the terminal, so as to avoid mutual interference. Since the timing of WLAN transmissions is often unpredictable, the terminal gives higher priority to the WiMAX scanning periods over WLAN transmissions, thus suspending the WLAN link for short periods. Coexistence processor typically uses the "busy" interfaces described above for suspending the WLAN link. Since the WLAN link may carry real-time applications such as Voice over IP (VoIP), in some embodiments WiMAX scanning periods are limited to 5 ms in every 20 ms time interval. This limitation is sufficient for performing a single measurement on a single WiMAX frequency once every 20 ms.

Once the terminal identifies a valid WiMAX BS signal, e.g., by detecting the preamble transmitted by the BS, the terminal receives Downlink Channel Descriptor (DCD) messages, which further identify the BS. In order to receive the DCD messages, the terminal attempts to receive the initial symbols of every subsequent WiMAX frame. As a result, the terminal acquires the timing of the WiMAX BS. The terminal suspends its WLAN transmissions for the first 1 ms or less, in every 5 ms WiMAX frame, in order to receive the preamble, downlink MAP and uplink MAP messages. This suspension ratio can usually be tolerated by the active WLAN sessions of the terminal.

As noted above, a Bluetooth link may be active in parallel to the handover procedure. When the Bluetooth link comprises an ACL link, its transmissions are usually asynchronous and sporadic. Thus, WiMAX scanning is given priority over Bluetooth ACL transmissions, and ACL transmissions are suspended during WiMAX scanning intervals.

When the Bluetooth link comprises an SCO link, on the other hand, the Bluetooth transmissions are synchronous and should not be delayed. SCO transmissions occur every 3.75 ms, in comparison with the 5 ms WiMAX frames. Thus, in every 15 ms period (the common multiple of 3.75 ms and 5 ms) there are at least two instances in which reception of the beginning of the WiMAX frame is not blocked by Bluetooth SCO transmissions.

In some embodiments, the terminal may increase the number of WiMAX scanning attempts in order to compensate for the possible interference caused by Bluetooth SCO transmissions. For example, the terminal may perform three or more measurement attempts for every WiMAX frequency assignment.

Once the terminal identified the WiMAX BS and acquired its timing, it performs the actual handover procedure, at a WiMAX handover execution step 150. WiMAX handover execution comprises multiple exchanges of control and data messages over the WiMAX link. This exchange of messages should comply with the timing of the WiMAX BS.

In some embodiments, WiMAX transmission and reception are given priority over both WLAN and Bluetooth ACL communication during handover execution. The timing of WiMAX transmission and reception periods in each WiMAX frame is known to the WiMAX transceiver of the terminal in advance. Coexistence processor 64 typically suspends the WLAN and Bluetooth ACL transmissions during the periods in which the preamble, FCH, downlink MAP and uplink MAP are received from the WiMAX BS. The coexistence processor also suspends WLAN and Bluetooth ACL transmission during time intervals, which are allocated to the terminal by the BS for uplink and downlink communication. The time intervals during which WLAN and Bluetooth ACL operation is suspended are typically short and sporadic, and therefore do not cause data loss or significant performance degradation.

When a Bluetooth SCO link is active during handover execution, the WiMAX link is typically given priority over the SCO link, since WiMAX handover execution is a one-time event that is critical to the continuity of user sessions. The WiMAX link is thus given priority until the terminal and WiMAX BS coordinate the reduced availability periods between them, as described above.

In some cases, the Bluetooth SCO link can be established before WiMAX timing is acquired by the terminal. Thus, it is not always possible to synchronize the WiMAX and Bluetooth SCO links. In the absence of synchronization between the WiMAX and Bluetooth SCO links, coexistence can be achieved using the dedicated COEXIST-REQ and COEXIST-RESP messages described above. The COEXIST-REQ message may comprise parameters as the time offset of the Bluetooth timing with respect to the WiMAX timing, a relation between SCO transmissions and the WiMAX frame number and the SCO period (Tsco). Using these parameters, the BS is able to estimate periods of reduced availability of the terminal that are caused by Bluetooth SCO transmissions. The BS can then schedule WiMAX transmissions in accordance with the estimated terminal availability.

Figure 7:
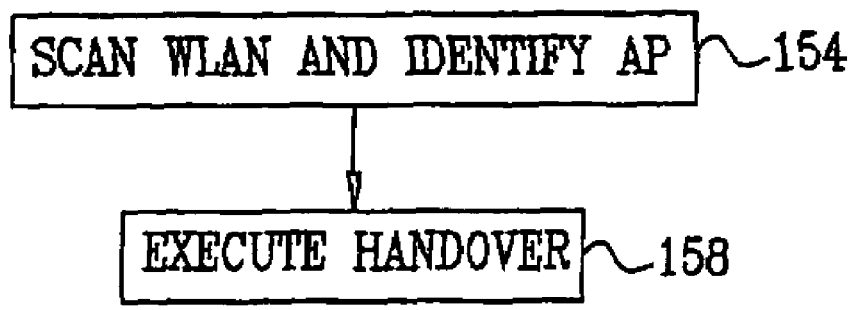
FIG. 7 is a flow chart that schematically illustrates a method for handing over a wireless terminal from a WiMAX network to a WLAN, in accordance with an embodiment of the present invention.

FIG. 7 is a flow chart that schematically illustrates a method for handing over terminal 22 from the WiMAX network to the WLAN in the presence of a Bluetooth link, in accordance with an embodiment of the present invention. The method begins with the terminal initiating a WLAN scanning procedure, attempting to identify a WLAN AP with which the terminal can communicate, at a WLAN scanning step 154. WLAN scanning is often performed while the terminal is actively communicating over the WiMAX link. Once a suitable AP is identified, the terminal associates and optionally authenticates with the AP. Existing WiMAX sessions should be preserved during the handover procedure. Once the active sessions are re-established via the WLAN AP, the terminal may de-register from the WiMAX network and deactivate its WiMAX link.

The handover from WiMAX to WLAN is generally not as time-critical as the handover in the opposite direction, since WLAN hotspots are usually contained within the WiMAX coverage area. In some cases, the handover from WiMAX to WLAN affects the continuity of the active sessions, such as when the user moves from an outdoor WiMAX coverage area into an indoor WLAN hotspot, in which the WiMAX coverage is poor.

WLAN scanning may comprise passive or active scanning. In passive scanning, the terminal listens on selected frequency channels and attempts to receive beacon frames, which are transmitted periodically by the WLAN AP. A typical beacon transmission period is 100 ms, and the terminal should typically remain on each frequency channel for at least twice this period in order to receive beacon frames with sufficient probability.

In active WLAN scanning, on the other hand, the terminal solicits AP responses by sending Probe Request frames. The AP responds with Probe Response frames. WLAN certification procedures recommend that the AP responds to Probe Requests within 5 ms. As a result, active scanning is usually significantly faster than passive scanning. A typical scanning time is on the order of 10 ms per attempt per frequency channel. Given the active and passive scanning time constants, the terminal preferably uses active WLAN scanning when the WiMAX link is active.

Before beginning active scanning, the terminal coordinates reduced availability periods with the WiMAX BS, as described above. Using the coordinated reduced availability periods, the terminal suspends its WiMAX transmissions for two successive WiMAX frames, or 10 ms. In each suspension period, the terminal performs a single probe of one WLAN frequency channel. Each WLAN frequency channel is probed at least twice to increase the probability of detecting the AP.

When a Bluetooth ACL link is active during WLAN scanning, the Bluetooth ACL transmissions are similarly suspended during the 10 ms WLAN scanning period. When a Bluetooth SCO link is active during WLAN scanning, SCO transmissions are give priority over the WLAN scanning attempts. Since the SCO transmissions, occurring at 3.75 ms periods, may interfere with reception of AP responses, this prioritization may reduce the probability of detecting the WLAN AP. In order to compensate for the reduced probability, the terminal may increase the number of WLAN probe attempts.

Once the WLAN AP is identified, the terminal executes the actual handover procedure, at a WLAN handover execution step 158. The WLAN handover execution procedure comprises an exchange of multiple management and data messages between the terminal and the AP. Although these transmissions are usually not time-critical, the entire handover procedure may take up to several seconds, particularly when the AP uses WPA-1x authentication. Since the WLAN message exchange is usually not time-critical, the WiMAX and Bluetooth links are usually given priority over the WLAN link during handover execution.

Since WLAN packets of the active user sessions are not duplicated between the WLAN and WiMAX links during handover execution, the user sessions and their associated Quality-of-Service (QoS) flows are typically re-established on the WLAN link after the WiMAX link is terminated. Once the active user sessions are re-established over the WLAN link, the terminal de-registers from the WiMAX network using known IEEE 802.16 management messages.

In some cases, the terminal may perform handover from WiMAX to WLAN while the WiMAX link is in idle mode. In these cases, and particularly since associating with the WLAN may take considerable time, it is desirable that the terminal be able to receive pages from the WiMAX network during the handover procedure. Thus, the terminal can suspend the WLAN link during idle mode listening periods. Bluetooth ACL transmissions can be similarly suspended during the idle mode listening periods.

When a Bluetooth SCO link is active, the SCO transmissions are usually given priority over the WiMAX link, thus reducing the probability of successfully receiving a page and potentially extending the paging procedure. Nevertheless, this degradation can be tolerated in most scenarios.

Although the embodiments described herein mainly address coordination of WiMAX, WLAN and Bluetooth links in a single communication terminal, the principles of the present invention can also be used in coexistence between only two of these protocols. Generally, the methods and systems described herein can be used for coordinating the transmissions of any suitable long-range base-station protocol with any suitable local, short-range protocol. Furthermore, these principles may also be applied in coexistence schemes involving other sorts of wireless protocols, such as Ultra-WideBand (UWB) protocols, the protocols defined by the Third Generation Partnership Project (3GPP) Long Term Evolution (LTE), 3GPP2 Evolution-Data Optimized (EVDO) Rev C (UMB) and the IEEE 802.20 High Speed Mobile Broadband Wireless Access (MBWA) specifications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
   receiving a sequence of time frames at a wireless terminal from a Base Station (BS) of a long-range wireless network using a first communication protocol;
   establishing a communication session between the wireless terminal and a peripheral wireless device using a second, short-range communication protocol different from the first communication protocol;
   allocating at the wireless terminal time slots of the second communication protocol for communication with the peripheral wireless device, and time intervals of the first communication protocol for communication with the BS, by deriving a timing of the time slots from the time frames of the first communication protocol transmitted by the BS while giving the time slots of the second communication protocol precedence over the time intervals of the first communication protocol; and
   concurrently communicating between the wireless terminal and the BS and the peripheral device in the allocated time intervals and the allocated time slots, respectively.

2. The method according to claim 1, wherein the long-range wireless data network comprises a WiMAX network that operates in accordance with an IEEE 802.16 standard, and wherein the second protocol operates in accordance with a Bluetooth Core Specification.

3. The method according to claim 2, wherein the second protocol operates in accordance with at least one of a Synchronous Connection-Oriented (SCO) mode and an Asynchronous Connectionless Link (ACL) mode of the Bluetooth core specification.

4. The method according to claim 1, and comprising establishing an additional communication session with an access point (AP) of a wireless local area network (WLAN) in accordance with a third protocol different from the first and second protocols, during time periods that do not overlap the time slots of the first protocol and the time intervals of the second protocol, and communicating with the AP over the allocated time periods concurrently with communication with the BS and the peripheral device.

5. The method according to claim 4, wherein the third protocol comprises a protocol in which the time periods are initiated by the wireless terminal, and wherein establishing the additional communication session comprises selecting the time periods by the wireless terminal so as not to overlap the time slots and the time intervals.

6. The method according to claim 4, wherein the WLAN operates in accordance with an IEEE 802.11 standard.

7. The method according to claim 4, and comprising allocating additional optional time slots to one of the first, second and third protocols when not previously allocated to another of the first, second and third protocols.

8. The method according to claim 4, wherein the third protocol operates in accordance with an Unscheduled Power Save Delivery (UPSD) mode of the IEEE 802.11 standard.

9. The method according to claim 4, wherein communicating between the wireless terminal and the BS comprises handing over the wireless terminal from the WLAN to the long-range wireless data network while the additional communication session is in progress.

10. The method according to claim 4, wherein establishing the additional communication session comprises handing over the wireless terminal from the long-range wireless data network to the WLAN while the additional communication session is in progress.

11. The method according to claim 1, wherein the second communication session comprises a voice connection between the wireless terminal and the peripheral device, and wherein allocating the time slots comprises allocating the time slots at regular intervals.

12. The method according to claim 1, wherein allocating the time intervals comprises notifying the BS that the wireless terminal is not available to communicate with the BS outside the allocated time intervals.

13. The method according to claim 1, wherein establishing the communication session comprises initially establishing the communication session such that the timing of the time slots is determined by the peripheral device, and subsequently causing the timing of the time slots to be determined by the wireless terminal, so as to enable the time slots to be synchronous with the time frames transmitted by the BS.

14. The method according to claim 13, wherein causing the timing of the time slots to be determined by the wireless terminal comprises invoking a Master-Slave Switching (MSS) procedure defined in the second protocol.

15. The method according to claim 13, wherein causing the timing of the time slots to be determined by the wireless terminal comprises aborting establishment of the communication session by the wireless terminal after receiving an address of the peripheral device, and initiating a paging procedure by the wireless terminal using the received address, so as to re-establish the communication session with the timing of the time slots determined by the wireless terminal.

16. The method according to claim 1, wherein establishing the communication session comprises carrying out an inquiry procedure by the wireless terminal in order to identify the peripheral device, and coordinating the allocated time slots and time intervals during the inquiry procedure.

17. The method according to claim 1, wherein establishing the communication session comprises transmitting synchronization transmissions from the wireless terminal to the peripheral device in a low-power mode of the second protocol, and giving a priority to the synchronization transmissions over the time intervals of the first protocol.

18. The method according to claim 1, wherein establishing the second communication session comprises transmitting paging transmissions between the wireless terminal and the peripheral device for establishing the second communication session, while coordinating the exchange of the paging transmissions with the time intervals of the first protocol.

19. The method according to claim 1, wherein establishing the communication session comprises defining a subset of the time frames of the first protocol as reduced-availability frames, notifying the BS that the wireless terminal is not available to communicate with the BS during the reduced-availability frames, and giving a priority to establishing the communication session during the reduced-availability frames.

20. A wireless communication terminal, comprising:
a radio frequency (RF) unit;
a baseband processing circuit, which is coupled to cause the RF unit to transmit and receive signals over the air so as to receive a sequence of time frames from a Base Station (BS) of a long-range wireless network using a first communication protocol, and to establish a communication session between the wireless terminal and a peripheral wireless device using a second, short-range communication protocol different from the first communication protocol; and
a coexistence processor, which is arranged to allocate time slots of the second communication protocol for communication with the peripheral wireless device, and time intervals of the first communication protocol for communication with the BS, by deriving a timing of the time slots from the time frames of the first communication protocol transmitted by the BS while giving the time slots of the second communication protocol precedence over the time intervals of the first communication protocol, so as to concurrently communicate between the wireless communication terminal and the BS and the peripheral device in the allocated time intervals and the allocated time slots, respectively.

21. The terminal according to claim 20, wherein the long-range wireless data network comprises a WiMAX network that operates in accordance with an IEEE 802.16 standard, and wherein the second protocol operates in accordance with a Bluetooth Core Specification.

22. The terminal according to claim 21, wherein the second protocol operates in accordance with at least one of a Synchronous Connection-Oriented (SCO) mode and an Asynchronous Connectionless Link (ACL) mode of the Bluetooth core specification.

23. The terminal according to claim 20, wherein the baseband processing circuit is further arranged to establish a third an additional communication session with an access point (AP) of a wireless local area network (WLAN) in accordance with a third protocol different from the first and second protocols, and wherein the coexistence processor is arranged to allocate time periods for the additional communication session that do not overlap the time slots of the first protocol and the time intervals of the second protocol, so as to communicate with the AP over the allocated time periods concurrently with communication with the BS and the peripheral device.

24. The terminal according to claim 23, wherein the third protocol comprises a protocol in which the time periods are initiated by the wireless terminal, and wherein the coexistence processor is arranged to select the time periods so as not to overlap the time slots and the time intervals.

25. The terminal according to claim 23, wherein the WLAN operates in accordance with an IEEE 802.11 standard.

26. The terminal according to claim 23, wherein the coexistence processor is arranged to allocate additional optional time slots to one of the first, second and third protocols when not previously allocated to another of the first, second and third protocols.

27. The terminal according to claim 23, wherein the third protocol operates in accordance with an Unscheduled Power Save Delivery (UPSD) mode of the IEEE 802.11 standard.

28. The terminal according to claim 23, wherein the baseband processing circuit and the coexistence processor are arranged to hand over the wireless terminal from the WLAN to the long-range wireless data network while the additional communication session is in progress.

29. The terminal according to claim 23, wherein the baseband processing circuit and the coexistence processor are arranged to hand over the wireless terminal from the long-range wireless data network to the WLAN while the additional communication session is in progress.

30. The terminal according to claim 23, wherein the baseband processing circuit comprises first, second and third transceivers, which are respectively arranged to communicate with the BS, the peripheral device and the AP, and wherein the coexistence processor is connected to the transceivers using respective coexistence interfaces and is arranged to allocate the time intervals, time slots and time periods by signaling to the transceivers over the coexistence interfaces.

31. The terminal according to claim 30, wherein the baseband processing circuit comprises a first sub-circuit comprising the second and third transceivers, and a second sub-circuit comprising the first transceiver and the coexistence processor, and wherein the coexistence processor is arranged to control the second and third transceivers using the coexistence interfaces, which are connected between the first and second sub-circuits.

32. The terminal according to claim 20, wherein the communication session comprises a voice connection between the wireless terminal and the peripheral device, and wherein the coexistence processor is arranged to allocate the time slots at regular intervals.

33. The terminal according to claim 20, wherein the baseband processing circuit is arranged to notify the BS that the wireless terminal is not available to communicate with the BS outside the allocated time intervals.

34. The terminal according to claim 20, wherein the baseband processing circuit is arranged to initially establish the communication session such that the timing of the time slots is determined by the peripheral device, and to subsequently cause the timing of the time slots to be determined by the wireless terminal, so as to enable the time slots to be synchronous with the time frames transmitted by the BS.

35. The terminal according to claim 34, wherein the baseband processing circuit is arranged to cause the timing of the time slots to be determined by the wireless terminal by invoking a Master-Slave Switching (MSS) procedure defined in the second protocol.

36. The terminal according to claim 34, wherein the baseband processing circuit is arranged to cause the timing of the time slots to be determined by the wireless terminal by aborting establishment of the communication session by the wireless terminal after receiving an address of the peripheral device, and initiating a paging procedure by the wireless terminal using the received address, so as to re-establish the communication session with the timing of the time slots determined by the wireless terminal.

37. The terminal according to claim 20, wherein the baseband processing circuit is arranged to carry out an inquiry procedure in order to identify the peripheral device, and wherein the coexistence processor is arranged to coordinate the allocated time slots and time intervals during the inquiry procedure.

38. The terminal according to claim 20, wherein the baseband processing circuit is arranged to transmit synchronization transmissions to the peripheral device in a low-power mode of the second protocol, and wherein the coexistence processor is arranged to give a priority to the synchronization transmissions over the time intervals of the first connection.

39. The terminal according to claim 20, wherein the baseband processing circuit is arranged to exchange paging transmissions between the wireless terminal and the peripheral device for establishing the communication session, and wherein the coexistence processor is arranged to coordinate the exchange of the paging transmissions with the time intervals of the first protocol.

40. The terminal according to claim 20, wherein the coexistence processor is arranged to define a subset of the time frames of the first protocol as reduced-availability frames, to notify the BS that the wireless terminal is not available to communicate with the BS during the reduced-availability frames, and to give a priority to establishing the second communication session during the reduced-availability frames.

* * * * *